Aug. 11, 1970       L. L. CAVE       3,523,816

METHOD FOR PRODUCING PURE SILICON

Filed Oct. 27, 1967

INVENTOR

LOUIS L. CAVE

V. Bryan Medlock, Jr.

ATTORNEY

United States Patent Office 3,523,816
Patented Aug. 11, 1970

3,523,816
METHOD FOR PRODUCING PURE SILICON
Louis L. Cave, Celina, Tex., assignor to Texas Instruments Incorporated, Dallas, Tex., a corporation of Delaware
Filed Oct. 27, 1967, Ser. No. 678,749
Int. Cl. C23c 11/06
U.S. Cl. 117—106                  5 Claims

ABSTRACT OF THE DISCLOSURE

In the method of producing pure silicon by passing a gaseous mixture of hydrogen and a halosilane, such as trichlorosilane, through quartz reaction chamber for contacting the gases with the surface of a heated silicon substrate supported within the chamber and depositing silicon from the gases onto the surface of the silicon subsrate, the improvement which comprises preheating the gases to a temperature between about 90° C. and the decomposition temperature of the gaseous mixture by passing the gases through a conduit positioned in proximity to the outer surface of the reaction chamber before discharging the gas from the conduit into the reaction chamber. The heat radiated from the reaction chamber is thus utilized to preheat the reaction gases to achieve greater deposition rates than can be obtained by using unheated gases.

---

This invention relates to an improved method of producing pure silicon, and more particularly, to producing pure silicon by hydrogen reduction of a halosilane in the presence of a heated silicon substrate.

It is common practice in the production of electronically pure silicon to support a rod of pure silicon within a quartz reaction chamber where the rod may be heated by passing an electric current therethrough. Once the silicon rod has been elevated to a temperature between about 850° C. and the melting point of silicon, a gaseous mixture of hydrogen and a halosilane, such as trichlorosilane, is circulated through the quartz reaction chamber. The halosilane will be reduced by the hydrogen on contacting the hot surface of the silicon rod to form elemental silicon thus enlarging the size of the rod. If, for example, hydrogen and trichlorosilane are the gases being utilized to deposit silicon upon the silicon rod, the gases will undergo a reduction reaction, as described above, which reaction may be represented in a simplified manner as follows:

(1)            $H_2 + SiHCl_3 \rightarrow Si + 3HCl$

After sufficient silicon has been deposited upon the silicon rod supported within the reaction chamber, the rod is removed and prepared for use as semiconductor material, all of which is known to those skilled in the art.

The gaseous mixture of hydrogen and the halosilane is normally introduced into the reaction chamber at room temperature, which may vary between 15° C. and 40° C.

Prior art techniques for growing silicon rods are described in more detail in U.S. Pat. 3,146,123 issued to Bischoff on Aug. 25, 1964, and U.S. Pat. 3,134,695 issued to Henker et al. on May 26, 1964.

Figure 1:
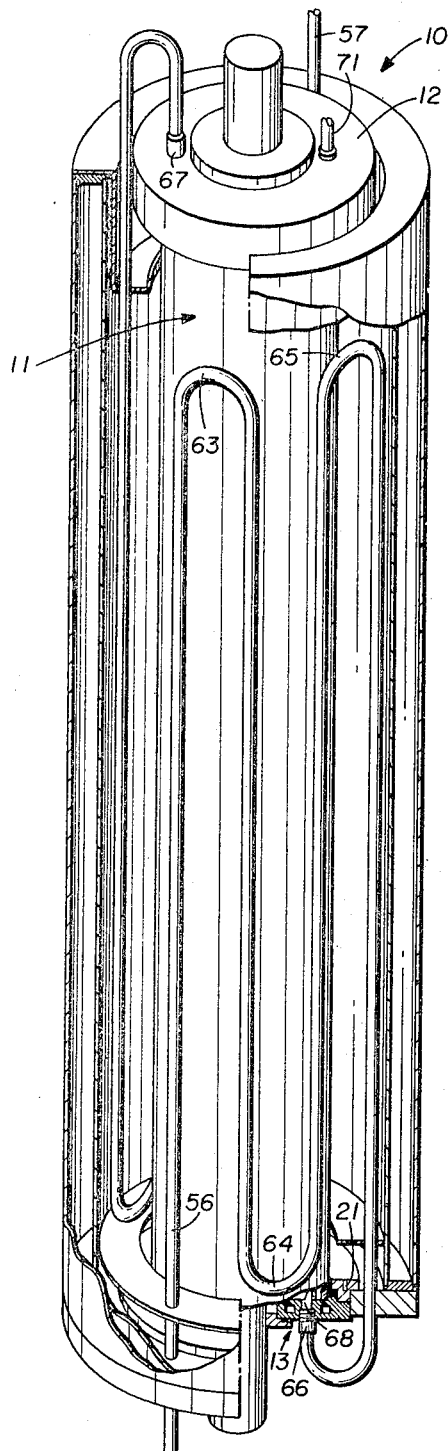
Figure 2:
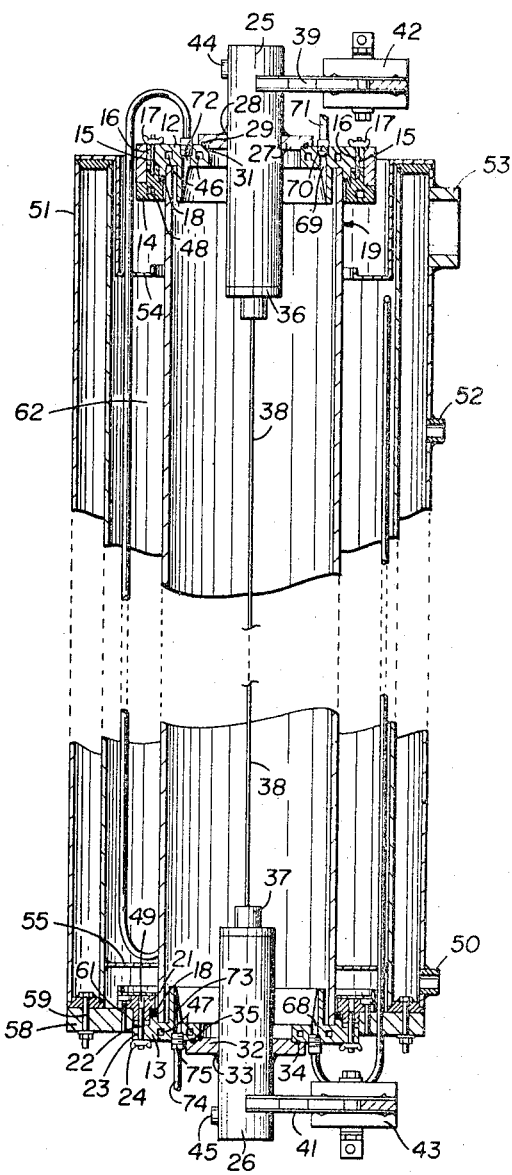

The present invention is an improved method for growing pure silicon by depositing silicon from gases onto a silicon substrate which improves the deposition rate and therefore renders the production of pure silicon more economical. The invention may be generally described as a method for producing pure silicon by passing a gaseous mixture of hydrogen and halosilane through a reaction chamber to contact the gaseous mixture with the surface of a heated silicon substrate supported within the chamber for depositing silicon from the gaseous mixture onto the surface of the silicon substrate, which includes the improvement of pre-heating the gaseous mixture to a temperature between about 90° C. and the decomposition temperature of the gaseous mixture before introducing the gaseous mixture into the reaction chamber. To be more specific, reference is here made to the drawings, in which:

FIG. 1 is a partially cutaway perspective view of apparatus for carrying out the present invention; and FIG. 2 is an elevational view in cross-section of the apparatus illustrated in FIG. 1.

With reference to FIG. 1, the reactor 10 comprises an elongated quartz tube 11 contained between annular end plates 12 and 13. As illustrated in more detail in FIG. 2, to which reference is here made, end plate 12 is affixed to the top end of quartz tube 11 by an annular clamp ring 14. Clamp ring 14 is provided with a plurality of upstanding bolts 15 which pass through apertures 16 in end plate 12 and receive wing nuts 17, the tightening of which serve to clamp an O-ring 18 of rubber, Teflon or the like, between the end plate 12 and clamp ring 14. Compression of O-ring 18 forces O-ring 18 into engagement with the outer surface 19 of quartz tube 11 to form a tight seal therewith.

End plate 13 similarly is affixed to the bottom end of quartz tube 11 by an annular clamp ring 21 provided with a plurarity of bolts 22 which pass through apertures 23 in end plate 13 and receive wing nuts 24. Tightening of wing nuts 24 serves to compress another O-ring 18 between clamp ring 21 and end plate 13. Compression of the O-ring 18 effects sealing engagement between the O-ring 18 and the outer surface 19 of quartz tube 11. Through end plates 12 and 13 pass electrodes 25 and 26, respectively. Electrode 25 is provided with ring shaped flange 27 secured thereto by weldment 28. Flange 27 is also provided with an annular groove 29 which receives an O-ring 31. O-ring 31 serves to provide a gas-tight seal between flange 27 and end plate 12. Electrode 26 similarly is provided with a circular flange 32 secured thereto by weldment 33. Flange 32 is provided with a groove 34 fitted with an O-ring 35 which acts as a seal between flange 32 and end plate 13. Electrodes 25 and 26 are provided with graphite chucks 36 and 37 which receive within and support therebetween an elongated silicon rod 38. Electrodes 25 and 26 are also provided with conductor arms 39 and 41, respectively, to which are affixed clamps 42 and 43, respectively. Clamps 42 and 43 are in electrical communication with a conventional variable D.C. power source to permit passage of a current through silicon rod 38. Electrode 25 is cooled, during operation of the reactor 10, by passing water into the electrode 25 through port 44 and exhausting the cooling water through a second port, not illustrated. Electrode 26 is similarly cooled by passing water through a port 45. The water will exit the electrode 26 through a second port, not illustrated. End plates 12 and 13 are provided with cooling chambers 46 and 47, respectively, into which water may be injected and extracted by conduits, not illustrated. Similarly, clamp rings 14 and 21 are provided with cooling chambers 48 and 49 into which water may be injected and extracted through suitable conduits, not illustrated. Since the temperature of silicon rod 38 will normally be elevated to temperatures around 1080° C., the reactor 10 includes a hollow jacket 51 into which water is introduced through port 52 and steam is extracted through port 53 to protect those working in the vicinity of the reactor from the high temperatures which will exist in the proximity of quartz tube 11. There is also provided a drain plug 50 to assist in periodic cleaning of the jacket 51. The ends of jacket 51 are also provided with annular heat shields 54 and 55 to minimize heat radiation through the ends of the reactor 10.

To permit introduction of a preheated gaseous mixture of hydrogen and a halosilane into the quartz tube 11, there are provided conduits 56 and 57 which communicate with end plates 13 and 12, respectively. Specifically, conduit 56 enters the bottom of reactor 10 through a phenolic board 58 secured to jacket 51 by a plurality of bolts 59 and to clamp ring 21 by a plurality of screws 61. Phenolic board 58 serves to insulate the jacket 51 from electrode 26. After passing through phenolic board 58, conduit 56 passes upwardly through the chamber 62 defined between jacket 51 and quartz tube 11. Conduit 56 is provided with U-shaped returns 63, 64 and 65 producing a serpentine shaped portion which is also arcuate to conform to the shape of chamber 62. After passing up and down substantially the full length of quartz tube 11, conduit 56 exits chamber 62 by passing through flange 55 and phenolic board 58 before discharging into end plate 13 to which it is connected by a suitable nipple 66. The other conduit 57 passes through heat shield 54 and like conduit 56 forms three looped portions within chamber 62 before it again passes upwardly through heat shield 54 and returns to end plate 12 to which it is connected by a suitable nipple 67.

A gaseous mixture of hydrogen and a halosilane, such as trichlorosilane, introduced through conduit 56 will be heated as it passes through chamber 62 due to heat radiated from silicon rod 38, and as it enters end plate 13 will pass through port 68 provided therein, pass upwardly through quartz tube 11 where the gaseous mixture will contact the silicon rod 38 and undergo reaction (1) above. The gases, after reacting, will exit the reactor 10 through port 69 in end plate 12 and conduit 71 attached to end plate 12 by nipple 70.

Means, such as a four-way valve, are provided externally of reactor 10 to simultaneously terminate the flow through conduits 56 and 71 and open conduits 57 and 74. Hydrogen and halosilane admitted through conduit 57 will pass through port 72 in end plate 12 and into quartz tube 11 from which it will exit through end plate 13 by way of port 73 and conduit 74 which is secured to end plate 13 by nipple 75. Thus, a gaseous mixture of hydrogen and a halosilane may be introduced through either conduit 56 or conduit 57, for reasons which will be explained in more detail hereafter.

The apparatus described above may be utilized to carry out the present invention, as is explained in the following examples:

EXAMPLE I

Between the graphite chucks 36 and 37 of the reactor 10 illustrated in FIGS. 1 and 2 was supported a "pulled" polycrystalline filament ¼ inch in diameter and 40 inches in length. Quartz tube 11 had an I.D. of 8½ inches and an O.D. of 9 inches with a length of 51 inches. After mounting the silicon filament or rod 38 between graphite chucks 36 and 37, the quartz tube 11 was flushed for ten minutes with nitrogen introduced through conduit 56. After the nitrogen flush, hydrogen was circulated through conduit 56 for a ten minute period. Following the hydrogen flush, the quartz tube 11 was flushed with a gaseous stream containing, by volume, 90% hydrogen and 10% trichlorosilane for a period of thirty minutes. The quartz tube 11 was then flushed with pure hydrogen for an additional ten minutes, after which a 10,000 volt D.C. potential was developed across the silicon rod 38 to elevate the temperature of the rod to about 1080° C. Once the rod is elevated to 1080° C. it is only necessary to utilize approximately 100 volts D.C. to maintain the temperature, all of which is known to those skilled in the art. After the silicon rod has reached about 1080° C., quartz tube 11 was flushed with relatively pure hydrogen for a period of ten minutes, following which there was introduced into quartz tube 11 a gaseous stream containing, by volume, 90% hydrogen and 10% trichlorosilane. The initial flow rate of hydrogen and trichlorosilane admitted through conduit 56 was 20 liters per minute. The temperature of the stream of gas entering chamber 62 of reactor 10 through conduit 56 was approximately 20° C. or room temperature. As the gases passed through the portion of conduit 56 within chamber 62, the temperature was raised to approximately 90° C. Thus, the gaseous mixture entering end plate 13 was 90° C. The gas flow through tube 11 and thus the deposition of silicon from the gaseous stream of hydrogen and trichlorosilane was continued for 122.25 hours during which period the silicon rod being formed was maintained at 1080° C. During the 122.25 hour deposition period, the flow rate of the hydrogen and trichlorosilane stream was incrementally increased from 20 liters per minute to 100 liters per minute. The gas flow is increased from 2.0 to 4.0 liters per minute at two to four hour intervals during the deposition period. The temperature of the hydrogen and trichlorosilane stream entering quartz tube 11 was due to increase in heat being emitted from the silicon rod 38 as it grew in diameter. When the rod 38 reaches approximately 1.0 inch in diameter, flow is simultaneously terminated through conduits 56 and 71 and conduits 57 and 74 are opened to permit the gaseous mixture to enter the top of tube 11 and exit the bottom thereof. At the end of the deposition period the silican rod was removed, after being cooled, and was found to have a nominal diameter of 2.1 inches and a weight of 19.5 pounds. The deposition rate was determined to be 0.1600 pound (of silicon) per hour. The deposition rate of 0.1600 pound per hour was 51.6 percent greater than the deposition rate obtained with six other silicon rods grown under the identical conditions as those described above but without preheating of the hydrogen and trichlorosilane gas stream.

EXAMPLE II

The procedure of Example I was repeated, with the following exceptions. The deposition period was extended to 193.5 hours, and the flow rate of the hydrogen and trichlorosilane stream was increased at four hour intervals during the deposition period from 20 liters per minute to 180 liters per minute. The temperature of the hydrogen-trichlorosilane stream varied from 90° C. to 260° C. The resulting silicon rod had a nominal diameter of 3.6 inches and weighed 33.1 pounds. As the rod reached approximately 3.0 inches in diameter flow was terminated in conduit 57 and reestablished in conduit 56. The deposition rate was found to be 0.1711 pound per hour, which was an increase of 39.2 percent over the deposition rate obtained by producing silicon rods under identical conditions, but without preheating the hydrogen and trichlorosilane stream.

EXAMPLE III

The procedure of Example II was repeated, except the period of deposition was limited to 180.0 hours during which a silicon rod having a nominal diameter of 3.6 inches was produced. The silicon rod weighed 33.2 pounds. The deposition rate was determined to be 0.1844 pound per hour, which was an increase of 45.6 percent over 20 silicon rods grown under identical conditions, but without preheating of the reacting gases.

EXAMPLE IV

The procedure of Example I was repeated, with the following exceptions. The deposition period was limited to 98.5 hours which produced a silicon rod having a nominal diameter of 2.1 inches. The rod was found to weigh 13.5 pounds, and the deposition rate was determined to be 0.1370 pound per hour. The deposition rate of 0.1370 pound per hour was found to be 20.0 percent greater than the deposition rate obtained upon fifteen other silicon rods formed under the identical conditions, but without preheated reacting gases.

EXAMPLE V

The procedure of Example II was repeated, with the following exceptions. The deposition period was extended to 212.0 hours producing a rod having a norminal diameter of 3.7 inches. The deposition rate was determined to be 0.1842 pound per hour, which was a 20.6 percent greater deposition rate than obtained in depositing upon six other silicon rods under the identical conditions, but without preheating the reacting gases.

EXAMPLE VI

The procedure of Example II was repeated, with the following exceptions. The silicon was deposited upon the filament for 191.0 hours producing a silicon rod having a nominal diameter of 3.7 inches and weighing 37.8 pounds. The deposition rate was found to be 0.1979 pound per hour. The deposition rate of 0.1979 pound per hour was a 28.4 percent increase over the deposition rate observed by depositing silicon upon six other silicon rods under the identical conditions described above, but without preheating the reacting gases.

EXAMPLE VII

The procedure of Example II was repeated, with the following exceptions. The composition of the gaseous mixture was changed to, by volume, 95% hydrogen and 5% trichlorosilane. Silicon was deposited for 188.0 hours producing a rod having a nominal diameter of 3.6 inches and weighing 38.3 pounds. The deposition rate was determined to be 0.2034 pound per hour. The deposition rate was 17.6 percent greater than the deposition rate obtained on a silicon rod grown under identical conditions, but for a period of 198.0 hours.

EXAMPLE VIII

The procedure of Example I was repeated, with the following exceptions. The composition of the reacting gases was changed to, by volume, 95% hydrogen and 5% trichlorosilane. Silicon was deposited for a period of 130.0 hours producing a rod having a nominal diameter of 2.1 inches and weighing 16.3 pounds. The deposition rate was determined to be 0.1253 pound per hour which was an increase of 18.4 percent over the deposition rate obtained by depositing silicon upon a rod under the identical conditions, but for a period of 136.0 hours, and without the use of preheated reaction gases.

The temperature of the reacting gases of the above examples in which a silicon rod having a nominal diameter of approximately 2.1 inches was grown varied between 90° C. and 210° C., while the temperature of the reacting gases in those examples in which the silicon rod having a nominal diameter of 3.6 inches was grown varied between 90° C. and 260° C. During growth of the silicon rods in the above examples, the temperature of about 1080° C. was maintained throughout the deposition period and the flow rate of the hydrogen and trichlorosilane gaseous stream was varied between 20 liters per minute and 180 liters per minute to compensate for the increased surface area available for deposition.

The composition of the gaseous stream introduced into the quartz tube 11 may vary between 3% and 15% trichlorosilane, by volume, though concentrations in excess of 10% are not preferred. Additionally, the temperature of the silicon rod during the deposition period may vary between 850° C. and the melting point of silicon, all of which is well known to those skilled in the art.

The provision of means for alternating the flow of the gases from either top to bottom or bottom to top of tube 11 minimizes the taper of the final silicon rod. If the gases are only introduced through one end of the reactor 10 during the entire deposition phase, then a taper would develop on the silicon rod due to one end of the rod being in contact with a gas stream of different concentration than would the other end. The pre-heating of the gases is believed to also assist in preventing rod taper since the temperature of the gases throughout the length of tube 11 will be more uniform than if a cool gas is introduced into one end.

Preheating is also believed to assist in preventing the cracking of silicon rods due to thermal shock since the temperature differential between the gas contacting the surface of the rod and the temperature of the rod will be less when preheated gases are used.

While the invention has been described in connection with a reactor which carries only one silicon rod, it will be appreciated that the invention is equally applicable to reactors which carry plural filaments.

Also, various halosilanes may be employed in the reactor, as is well known to those skilled in the art. For example, silicon tetrachloride, tribromosilane, and the like may be employed though the fluoro-silanes are not preferred due to their reactiveness with many materials out of which the reactor may be constructed.

The gases may be preheated to higher temperatures than those described above, but should not be preheated to the decomposition temperature of the gases since at the decomposition temperature silicon will begin to deposit on the walls of the conduits eventually blocking the flow of gases into the reactor. The temperature at which silicon will begin to deposit, i.e., the decomposition temperature will vary depending upon the composition of halosilane in the hydrogen stream. Given the concentration, however, the decomposition or deposition temperature may be determined from published literature, which is known to those skilled in the art.

While rather specific expressions have been used in describing several embodiments of the invention, they are not intended, nor should they be construed, as limitations upon the invention as defined by the following claims.

What is claimed is:

1. In the method of producing pure silicon by passing a preheated gaseous deposition mixture of hydrogen and a halosilane which will react therewith through an enclosure within which is supported a heated silicon substrate to deposit silicon upon the substrate by reaction of the hydrogen and halosilane, the improvement which comprises preheating the gaseous mixture by:

passing the gaseous mixture through a heat conducting conduit positioned in proximity to the enclosure prior to introduction of the mixture into the enclosure to permit heat radiated from the substrate to heat the conduit and thereby the gas.

2. The method of claim 1, wherein said enclosure is an elongated heat conducting tube and said gaseous mixture is preheated by passing the gaseous mixture through a first conduit positioned in proximity to the outer surface of the tube.

3. The method of claim 2, wherein said first conduit discharges into a first end of said tube and there is also provided a second conduit which passes in proximity to the tube and discharges into the opposite end of said tube and said method includes the steps of:

introducing the preheated gases through said first conduit into one end of said tube for a period of time; and then introducing the preheated gases through the second conduit into the opposite end of the tube for a further period of time to produce a silicon rod having a substantially uniform diameter throughout its length.

4. The method of claim 3, wherein said halosilane is trichlorosilane.

5. The method of claim 1, wherein said enclosure and the filament supported therewithin are elongated, and the method includes the steps of:
  introducing the preheated gas into one end of said elongated enclosure for a period of time; and
  then introducing the preheated gas through the opposite end of the enclosure and withdrawing gas from the other end for a further period of time to produce a silicon rod having a substantially uniform diameter throughout its length.

References Cited

UNITED STATES PATENTS 3,146,123    8/1964    Bischoff.
3,057,690    10/1962    Reuschel et al.

ALFRED L. LEAVITT, Primary Examiner

W. E. BALL, Assistant Examiner

U.S. Cl. X.R.

117—107.2; 118—48, 49.2